US009977609B2

(12) United States Patent
Jayasena et al.

(10) Patent No.: US 9,977,609 B2
(45) Date of Patent: May 22, 2018

(54) EFFICIENT ACCESSES OF DATA STRUCTURES USING PROCESSING NEAR MEMORY

(71) Applicant: Advanced Micro Devices, Inc., Sunnyvale, CA (US)

(72) Inventors: Nuwan S. Jayasena, Sunnyvale, CA (US); Dong Ping Zhang, San Jose, CA (US); Paula Aguilera Diez, San Jose, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 54 days.

(21) Appl. No.: 15/063,186

(22) Filed: Mar. 7, 2016

(65) Prior Publication Data

US 2017/0255397 A1 Sep. 7, 2017

(51) Int. Cl.
*G06F 3/06* (2006.01)
*G06F 12/02* (2006.01)
*G06F 12/10* (2016.01)

(52) U.S. Cl.
CPC .......... *G06F 3/0613* (2013.01); *G06F 3/0658* (2013.01); *G06F 3/0673* (2013.01); *G06F 12/023* (2013.01); *G06F 12/10* (2013.01)

(58) Field of Classification Search
CPC .... G06F 3/0613; G06F 3/0658; G06F 3/0673; G06F 12/023; G06F 12/10
See application file for complete search history.

(56) References Cited

U.S. PATENT DOCUMENTS

| | | | |
|---|---|---|---|
| 2004/0034642 A1* | 2/2004 | Szilagyi | G06F 9/524 |
| 2016/0313916 A1* | 10/2016 | Sivananainth-aperumal | G06F 3/0644 |
| 2017/0060445 A1* | 3/2017 | Yang | G06F 3/0616 |

OTHER PUBLICATIONS

Gupta, et al., "A Study of Persistent Threads Style GPU Programming for GPGPU Workloads", Innovative Parallel computing (InPar), May 13-14, 2012, 14 pages, IEEE.
Orr, et al., "Fine-grain Task Aggregation and Coordination on GPUs", Proceeding of the 41st Annual International Symposium on Computer Architecuture, Jun. 14, 2014, 12 pages, IEEE Press, Piscataway, NJ, USA.

(Continued)

*Primary Examiner* — Reginald G Bragdon
*Assistant Examiner* — Edward Wang
(74) *Attorney, Agent, or Firm* — Rory D. Rankin; Meyertons, Hood, Kivlin, Kowert & Goetzel, P.C.

(57) ABSTRACT

Systems, apparatuses, and methods for implementing efficient queues and other data structures. A queue may be shared among multiple processors and/or threads without using explicit software atomic instructions to coordinate access to the queue. System software may allocate an atomic queue and corresponding queue metadata in system memory and return, to the requesting thread, a handle referencing the queue metadata. Any number of threads may utilize the handle for accessing the atomic queue. The logic for ensuring the atomicity of accesses to the atomic queue may reside in a management unit in the memory controller coupled to the memory where the atomic queue is allocated.

20 Claims, 10 Drawing Sheets

(56) References Cited

OTHER PUBLICATIONS

Nasre, et al., "Data-driven versus Topology-driven Irregular Computations on GPUs", Proceedings of the 2013 IEEE 27th International Symposium on Parallel and Distributed Processing, May 20, 2013, 12 pages, IEEE Computer Society, Washington, DC, USA.

Nasre, et al., "Atomic-free Irregular Computations on GPUs", Proceedings of the 6th Workshop on General Purpose Processor Using Graphics Processing Units, Mar. 16, 2013, 12 pages, ACM, New York, NY, USA.

Kim, et al., "Accelerating Irregular Algorithms on GPGPUs Using Fine-Grain Hardware Worklists", Proceedings of the 47th Annual IEEE/ACM International Symposium on Microarchitecture, Dec. 13, 2014, 13 pages, IEEE Computer Society, Washington, DC, USA.

* cited by examiner

EFFICIENT ACCESSES OF DATA STRUCTURES USING PROCESSING NEAR MEMORY

The invention described herein was made with government support under contract number DE-AC52-07NA27344 awarded by the United States Department of Energy. The United States Government has certain rights in the invention.

BACKGROUND

Technical Field

Embodiments described herein relate to data processing and more particularly, to systems and methods of efficiently managing data structures in a computing system.

Description of the Related Art

Shared data structures, such as queues, are often used to facilitate communication between entities, such as tasks or threads, in computing systems. However, managing the insertion and deletion of data in a shared data structure by multiple entities operating in parallel is difficult to coordinate. Existing implementations often use locks to coordinate manipulations of the shared data structure. Other implementations rely on techniques such as pre-calculation of offsets at which each thread would access the data structure (e.g., using prefix-sums), but add complexity and software overheads. In highly parallel environments, contention for shared data structures can be a significant performance bottleneck.

SUMMARY

Systems, apparatuses, and methods for implementing queues and other data structures are contemplated.

In one embodiment, a parallel processing system may include a plurality of processing units and a plurality of memory devices. The parallel processing system may utilize one or more shared data structures (e.g., queues) for sharing data among a plurality of threads executing on the system. In one embodiment, each queue may be accessed via an atomic queue management unit in the memory controller coupled to the memory where the queue is allocated. The atomic queue management unit may be configured to ensure the atomicity of enqueue and dequeue operations to the queue generated by a plurality of threads and/or a plurality of processing units. In one embodiment, there may be an atomic queue management unit for each memory channel of the system.

In one embodiment, application software may execute a system call (i.e., invoke a system software service) to allocate and register an atomic queue. In response to the execution of the system call for allocating the atomic queue, memory locations may be dynamically allocated for the atomic queue, and memory locations may also be dynamically allocated for the metadata defining the attributes of the atomic queue. The metadata may be initialized to point to the atomic queue. The system call may return a handle to the metadata and a status (e.g., success, failure) of the allocation of the atomic queue. Processes which access the queue may utilize the handle to the metadata to identify the queue.

In one embodiment, the queue metadata may be placed in a non-cacheable address space of system memory to prevent processors from caching the queue metadata. In one embodiment, the atomic queue and queue metadata may be allocated in system memory such that the queue and metadata are accessible over a single memory channel. Accordingly, system software may prevent the atomic queue and queue metadata from being allocated in memory locations that span multiple memory channels.

In one embodiment, in order to access an atomic queue, a thread may execute an explicit atomic queue instruction to read or write to the queue. When the atomic queue instruction is executed, the thread may generate and send an enqueue or dequeue operation to the atomic queue management unit, with the operation including the handle. When the atomic queue management unit receives the operation with the handle, the atomic queue management unit may identify the targeted queue from the handle, and then the atomic queue management unit may determine if the targeted queue is currently being accessed. Once any pending accesses are completed, the atomic queue management unit may utilize the handle to locate the queue metadata and perform an operation to the queue and perform operations to update the queue metadata. While the atomic queue management unit is performing the access to the queue and updating the queue metadata, the atomic queue management unit may prevent any other operations from accessing the same queue or the queue's metadata.

In another embodiment, in order to access an atomic queue, a process may execute a generic load or store instruction using the handle which points to the metadata of the atomic queue. In this embodiment, the atomic queue management unit may receive a corresponding load or store operation and determine whether the load or store operation targets an atomic queue. In response to determining that the load or store operation targets an atomic queue, the atomic queue management unit may generate and perform atomic operations to the targeted queue and metadata while stalling any other operations to the same queue and metadata. In various embodiments, other store and load operations, and other operations to other queues, may be performed in parallel with the atomic operations to the targeted queue.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Figure 1:
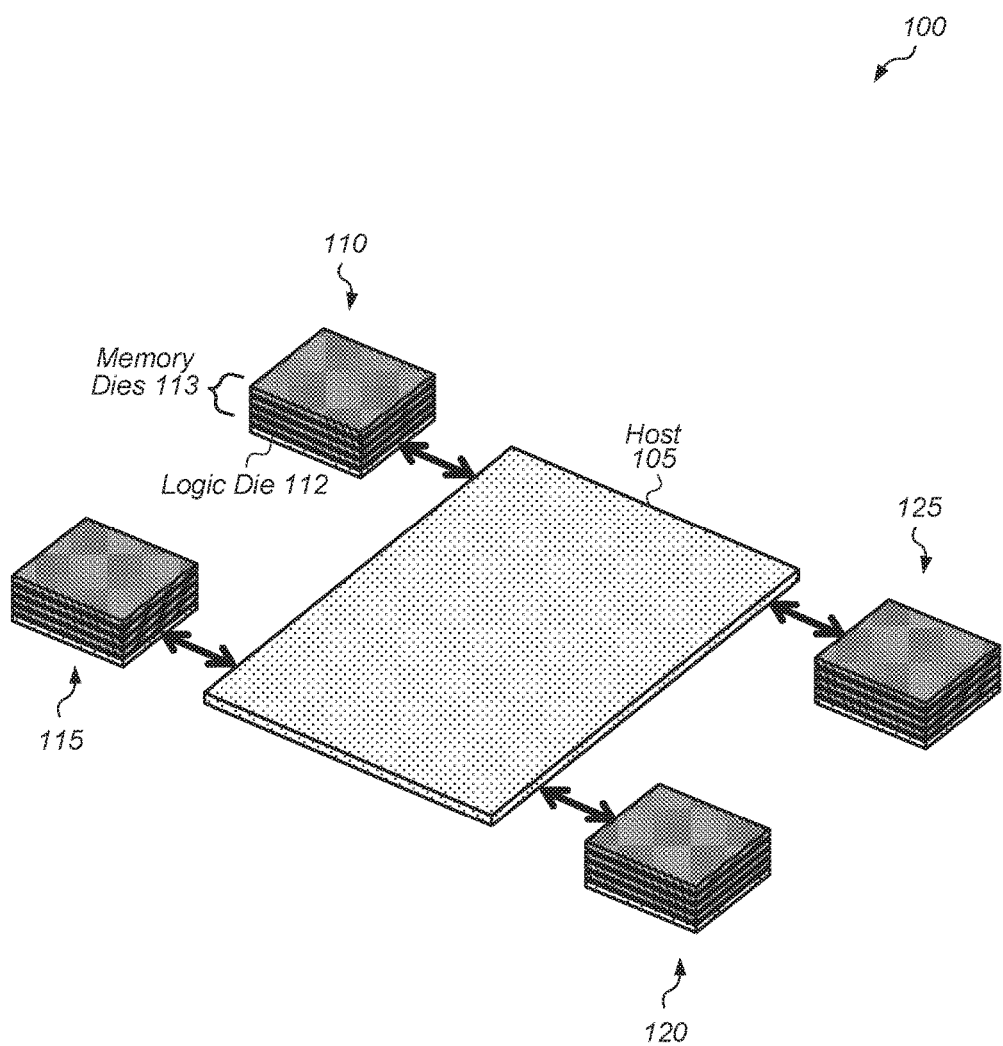
FIG. 1 is a block diagram of one embodiment of a system.

Referring now to FIG. 1, a block diagram of one embodiment of a system 100 is shown. The host 105 may be one or more processors (central processing unit (CPU), graphics processing unit (GPU), accelerated processing unit (APU), field programmable gate array (FPGA) etc.) that perform computations and issue memory requests to the memory modules 110, 115, 120, and 125. Each memory module may include one or more memory dies and one or more logic dies with built-in computation capabilities provided by processing near memory (PNM). For example, the computation capabilities of memory module 110 may be implemented on a separate logic die 112 which is 3D-stacked with the memory die(s) 113. Each of the other memory modules 115, 120, and 125 may be similarly constructed. However, the atomic queue implementations described herein are also applicable to cases where the near-memory computation capabilities are implemented directly on the memory dies. Still further, the atomic queue implementations described herein are also applicable in other system configurations that may consist of multiple host processors and memory modules interconnected in various configurations.

Efficient implementations of queues (or other shared data structures) can often lead to significant performance improvements for GPUs and other forms of parallel processors. Further, efficient support for task queues enables GPUs to more effectively and easily support general-purpose tasking and/or work-stealing-based run-time systems such as Concurrency Runtime from Microsoft® or CILK from Intel® as well as to further enhance GPU-oriented tasking techniques such as persistent threads and channels.

Various mechanisms for efficiently implementing queues in systems with near-memory or in-memory processing may be utilized. While queues may be utilized in some embodiments, the methods and mechanisms described herein may also be used to implement other data structures in addition to queues. Various methods and mechanisms may be utilized with PNM to efficiently implement queues and other well-known data structures exploiting PNM's proximity to memory as a natural serializing point to ensure atomicity. This enhances the throughput that can be sustained for such operations for highly parallel processors (e.g., GPU).

Figure 2:
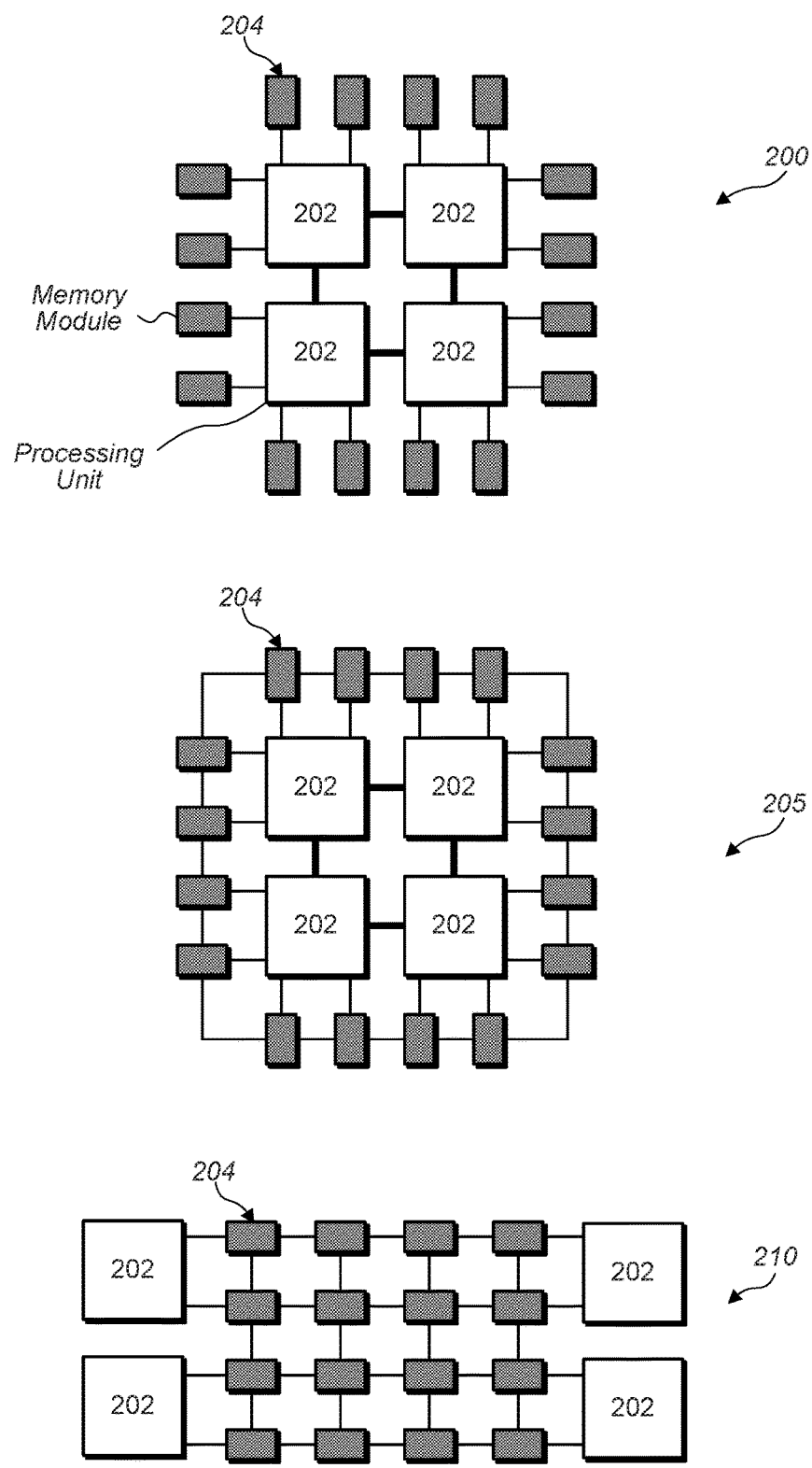
FIG. 2 includes block diagrams of various system configurations.

Turning now to FIG. 2, block diagrams of various three system configurations (200, 205, and 210) are shown, each depicting host processing units 202 and memory modules 204. In the system configuration 200, the four large squares (202) in the center of the configuration 200 represent host processing units. The 16 smaller rectangles (204) on the outside of configuration 200 represent memory devices or memory modules. Each memory module may include processing capabilities on a logic die separate from one or more memory die. System configuration 200 is an alternate configuration, as compared to system 100 (of FIG. 1), for implementing the methods and mechanisms described herein.

System configuration 205 illustrates another configuration which may utilize the atomic queue implementations described herein. System configuration 205 has connections between all of the memory modules on the outside of the configuration 205 to allow data to be sent back and forth directly between memory modules without passing through the processing units. Still further, system configuration 210 shows another configuration which may utilize the atomic queue implementations described herein. System configuration 210 has the memory modules in the center of configuration 210 and the processing units on the edges of configuration 210. It should be understood that other configurations, in addition to those shown in FIG. 2, for utilizing the atomic queue implementations described herein are possible and contemplated.

Figure 3:
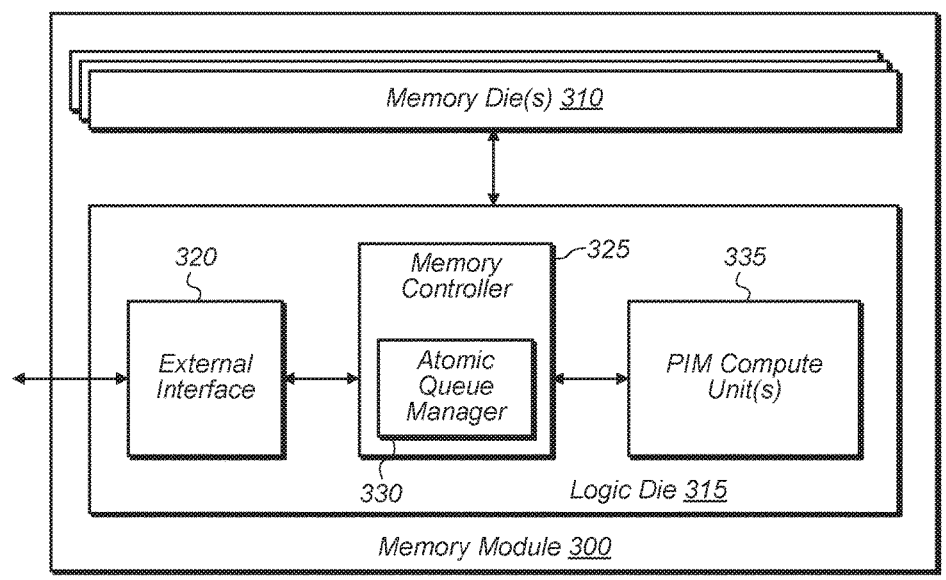
FIG. 3 is a block diagram of one embodiment of a memory module.

Referring now to FIG. 3, a block diagram of one embodiment of a memory module 300 is shown. Memory module 300 may include memory die(s) 310 and logic die 315. In one embodiment, the memory die(s) 310 may be implemented with dynamic random access memory (DRAM) devices. Logic die 315 may include external interface 320, memory controller 325, and processing in memory (PIM) compute unit(s) 335. Memory controller 325 may include atomic queue manager 330 to manage one or more atomic queues allocated in memory die(s) 310. It is noted that in another embodiment, memory controller 325 and atomic queue manager 330 may be located on one of the memory die(s) 310.

In one embodiment, an atomic queue management unit (e.g., atomic queue manager 330) may be implemented within the memory controller (e.g., memory controller 325) of each memory module. For simplicity, FIG. 3 shows a single atomic queue manager 330. In other embodiments, there may be one atomic queue manager per each memory channel in the memory module. Atomic queue manager 330 may be implemented using any suitable combination of hardware and/or software.

In one embodiment, when a given queue is allocated by system software, the given queue may be allocated such that the given queue does not span multiple memory modules or multiple memory channels. In this way, all accesses to the given queue may go through the same memory controller 325 and the same atomic queue manager 330. A queue may be allocated via a system call that allocates memory for the queue and sets up the necessary metadata in memory, returning a pointer to the metadata structure.

In one embodiment, an enqueue operation may be issued as a special store operation to the address of the queue (i.e., the address of the metadata block returned at queue allocation). A dequeue operation may be issued as a special load instruction to the address of the metadata block. In response to receiving an enqueue operation or a dequeue operation, the atomic queue manager 330 may update the queue metadata as necessary as well as atomically performing the requested queue operation.

Generally speaking, memory controller 325 may include at least a first interface configured to be coupled to one or more processors (e.g., PIM compute unit(s) 335, external processor(s)). It is noted that there may be one or more intervening components between memory controller 325 and the one or more processors on the first interface.

Memory controller 325 may also include multiple interfaces to local processors and to remote processors. Memory controller 325 may also include at least a second interface configured to be coupled to one or more memory devices (e.g., memory die(s) 310). Memory controller may also include control logic (e.g., atomic queue manager 330). In response to receiving a first operation from a first processor via the first interface, the control logic may be configured to perform a first access to metadata via the second interface, wherein the metadata corresponds to a data structure referenced by the first operation. Also in response to receiving the first operation from the first processor via the first interface, the control logic may be configured to perform a second access to the data structure via the second interface, wherein the second access is specified by the first operation. The first operation may be configured to write data to the data structure or read data from the data structure. Prior to completing the first and second access, memory controller 325 may receive a second operation from a second processor via the first interface (or via another interface). In response to determining that the second operation references the data structure, memory controller 325 may prevent accesses, corresponding to the second operation, from being performed to the data structure until after the first and second access have been completed.

Figure 4:
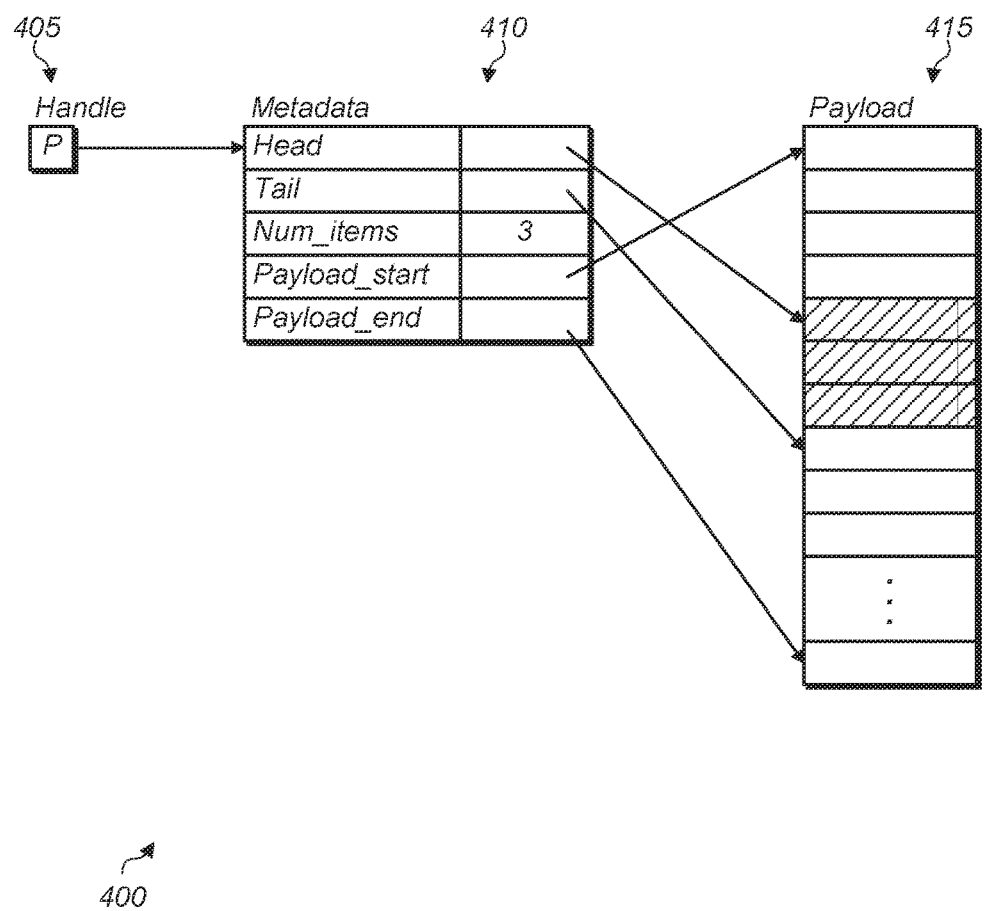
FIG. 4 is a block diagram of one embodiment of an atomic queue.

Turning now to FIG. 4, a block diagram of one embodiment of an atomic queue 400 is shown. In the example shown in FIG. 4, queue 400 has three elements stored in the queue payload 415. It is noted that the term "payload" refers to the data (to be) stored in a queue or other data structure. It is also noted that queue 400 in FIG. 4 is shown merely as an example of queue 400 at a particular point in time, and it should be understood that queue 400 may have any number of elements at different points in time.

Before being used, each atomic queue may be registered via a system call. In one embodiment, the system call may take one or two arguments: the maximum size of the queue and, optionally, which memory module the queue should be placed on. If the second argument is omitted, system software may select the module for placing the queue. The queue registration allocates the memory payload 415 for the queue 400 and sets up the necessary metadata 410. In one embodiment, the registration call may return the following 2 values:

1: P, an opaque handle 405 to the allocated queue.
2: S, registration status, which returns a SUCCESS code if the queue registration succeeded or an error code if failed (e.g., due to insufficient memory to allocate the queue).

The registration call sets up the necessary metadata 410 in a data structure located at the memory pointed to by P. In one embodiment, the metadata 410 may include head and tail pointers, a count of elements in the queue (initialized to zero at queue creation), and the start and end points of the memory space allocated for payload 415 storage of the queue 400 and/or the maximum size of the queue 400. In other embodiments, the metadata 410 may be structured in other suitable manners.

The specific implementation of the queue 400 may vary from embodiment to embodiment, and the methods and mechanisms described herein can be used to support various implementations of queues and other data structures. However, specifications of the hardware implementing the queue may describe the expected metadata structure (including size and location of various fields within the metadata structure) as they are to be setup by the queue registration software in the format expected by the hardware to access them.

In one embodiment, the queue 400 may be word-aligned and only single word entries may be written to the queue. This is sufficient for enqueuing task IDs or other such identifiers typically used in task queues. In other embodiments, other sizes of entries may be utilized for queue 400. If more complex data structures need to be enqueued, pointers to such structures can be enqueued (note that pointers placed on the queues as payload need not point to memory on the same memory module; the pointers can point to memory anywhere within the virtual address space of the system). Therefore, this implementation is sufficient for implementing queues of any general data structures.

In one embodiment, to enqueue, the application may perform the following operation:

status=atomic_enqueue(P, D)

In this operation, 'P' is the opaque queue handle 405 returned when the queue 400 was registered and 'D' is the data payload word to be enqueued. If the operation succeeds, a SUCCESS code may be stored in status upon completion. If the operation fails (e.g., the queue is full), an error code may be stored in status. In one embodiment, atomic_enqueue( ) may be implemented as a single instruction in the host processor. An example format for such an instruction may be the following:

aeq rs1, rs2, rd

Here, the 'aeq' mnemonic identifies the atomic enqueue instruction and 'rs1' and 'rs2' identify the two source operands: a register containing the queue handle and a register containing the data word to be enqueued ('P' and 'D' in the above example, respectively). Note that alternative implementations may allow either or both of the operands to be specified to be read from memory locations, as constants encoded in the instruction or to be computed using registers and/or constants (e.g., the queue handle formed by adding a constant operand from the instruction to a value in a register). The register 'rd' specifies where to store the status of the operation.

When executed on the host processor, the 'aeq' instruction generates an "enqueue" operation to the memory module to which the address pointed to by handle P maps to. Parameters P and D are passed as input operands to the enqueue memory operation (much like the address and data operands of a store operation). In one embodiment, in response to receiving the enqueue(P, D) operation, the near-memory processor (e.g., atomic queue manager 330 of FIG. 3) may perform the following operations atomically with respect to other queue operations using the same handle P:

First, the first operand (P, in this case) may be used to access the queue metadata structure. Second, if the metadata indicates the queue is full, the queue may remain unchanged and an error code may be returned to be stored in the status register at the host. Third, otherwise, if the metadata indicates the queue is not full, the data word (D, in this case) may be added to the next available slot of the data payload storage of the queue, the queue metadata may be updated as appropriate (e.g., adjust tail pointer, increment count of elements in queue), and a SUCCESS code may be returned to be stored in the status register at the host.

The above sequence of steps may either be implemented in hardware or in software/firmware with hardware providing only the support necessary to ensure atomicity.

An alternative implementation is to issue the enqueue operation as a simple store operation with 'P' as the address and 'D' as the data. The advantage of this approach is that the PNM capabilities can be used by processors that may not implement PNM-oriented instructions. In this implementation, the near-memory logic may check each incoming store operation's addresses against all registered queues in the module to detect enqueue operations. To reduce the overhead of doing so, a region of memory within the module may be set aside for queue metadata (the queue registration system software may abide by the same convention). Therefore, only addresses that fall with that region may be checked against handles of queues.

In either of the above implementations, only accesses to the same queue need to be serialized (i.e., the above sequence of operations need only be atomic with respect to other operations on the same queue). Other memory operations as well as operations to other queues may proceed in parallel.

Serialization among operations to the same queue may be enforced at a point where all accesses to a given address (e.g., P in this case) must go through (e.g., the memory controller). Once a queue operation starts, all other operations to that queue may be stalled at the serialization point until the in-flight operation completes. Some amount of buffering may be provisioned in the near-memory processor to hold stalled queue operations. If such buffering fills up, back-pressure may be applied to requestors. Alternatively, credit-based schemes may be used to ensure that the number of in-flight queue operations are limited to what can be accommodated in the available buffering. Note that separate credit pools may be used for queue operations and normal memory operations as normal memory operations are not stalled due to queue operations.

To dequeue, the application may perform the following operation:

status=atomic_dequeue(P, D)

Here, 'P' is the opaque queue handle returned when the queue was registered and 'D' is the register to store the data payload word to be dequeued. If the operation succeeds, a SUCCESS code may be stored in status upon completion. If the operation fails (e.g., the queue is empty), an error code may be stored in status.

In one embodiment, atomic_dequeue( ) may be implemented as a single instruction on the host processor. An example format for such an instruction may be the following:

adq rs, rd1, rd2

Here, the 'adq' mnemonic identifies the atomic dequeue instruction and 'rs' identifies the source operand: a register containing the queue handle (P in the above example). Note that alternate implementations may allow the source operand to be specified to be read from a memory location, as a constant encoded in the instruction or to be computed using a register and/or a constant (e.g., the queue handle formed by adding a constant operand from the instruction to a value in a register). Registers 'rd1' and 'rd2' specify where to place the two resulting values: the data value dequeued (D, in the above example) and the status of the operation.

When executed, the 'adq' instruction may generate a "dequeue" operation to the memory module to which the address pointed to by handle 'P' maps to. 'P' is passed as the input operand to the dequeue memory operation (much like the address operand of a load operation). In one embodiment, in response to receiving the dequeue(P) operation, the near-memory logic may perform the following operations atomically with respect to other queue operations using the same handle 'P':

First, the operand (P, in this case) may be used to access the queue metadata structure. Second, if the metadata indicates the queue is empty, the queue may remain unchanged and an error code may be returned to be stored in the status register at the host. Third, otherwise, if the metadata indicates the queue is not empty, the next available data word may be read from the data payload storage of the queue and returned to be stored in the result register (D, in this case), the queue metadata may be updated as appropriate (e.g., adjust head pointer, decrement count of elements in queue), and a SUCCESS code may be returned to be stored in the status register at the host The above sequence of steps may either be implemented in hardware or in software/firmware with hardware providing only the support necessary to ensure atomicity.

Similar to atomic_enqueue( ), atomic_dequeue( ) can be implemented as a separate instruction or via a load operation to the address 'P'. In the latter case, also similar to enqueue, the PNM may then compare the address of known queues with the queue handle being passed in (P) to determine which loads correspond to queue operations. Serialization considerations apply similarly to dequeue operations as for enqueue operations.

Note that in some implementations, an implicit status register may be set as a side effect of enqueue and dequeue operations to reflect error conditions instead of returning them to a user-specified register (status) as shown in the above examples. The instruction formats and field types in general are shown as examples only. The overall techniques are applicable to other forms of instruction encodings and formatting as well as other types of operand types (including, but not limited to, stack-based arguments, implicit register operands, immediate operands, and indirect operands read from memory). Still further, when a queue is no longer needed, it may be "de-registered" by system software, which frees up the memory allocated for it.

As a performance optimization, some implementations of atomic queue management units may cache the most recently-accessed metadata structures in a separate cache. As the format of these data-structures may be pre-defined (for hardware interpretation of software-defined data), the cache can be a specialized structure that facilitates the necessary metadata manipulations easily and efficiently. In other words, the cache does not need to be organized as a collection of cache lines (as is the case with a typical cache). Rather, the cache can be a hardware table for holding the metadata of the recently-accessed queues and can, optionally, incorporate hardware for efficient implementation of metadata manipulation operations. This cache may be indexed or looked-up based on the queue handle (P in above examples) or a hash of the queue handle.

Some implementations may optionally set aside a region of the memory module's memory capacity as a shared overflow space for enqueues received for queues that are full. This buffer space may be set aside by system software and the queue management hardware may be configured to use the buffer space. The size of this space may be set statically or changed dynamically depending on demand by system software. The buffer space may include metadata stored with or separate from the data that allows the hardware to determine how the data in the shared overflow space fits within the queue.

In such an implementation, enqueues received for a full queue may be stored in the overflow buffer space and a SUCCESS status may be sent to the initiating processor. Entries in the buffer space may be annotated with information on which queue they are intended for. They may be stored in locations based on a hash of the intended queue handle (e.g., P in above examples) to facilitate efficiently locating this data in the buffer space. Any time an element is dequeued from a full queue, the buffer space may be searched for any pending buffered entries for that queue. If any such entries are found, one of them may be inserted into the queue as part of the dequeue sequence.

Such an implementation of a shared buffer space has the following benefits. First, in cases where the anticipated occupancy of each queue has high variance, the shared buffer space allows for the allocation of a single large space for overflow rather than having to over-allocate space for each individual queue. Second, in cases where the round-trip latency of enqueue operations is high (e.g., requests from a remote processor), reducing the number of enqueue failures can improve performance. When a queue is de-registered, any data intended for that queue in the buffer space may also be freed up.

The above examples describe efficient implementations of queues. Similar implementations with efficient, hardware-guaranteed atomic insertion and deletion of elements are possible for other data structures where the primary operations are insertion and deletion according to pre-defined semantics. Stacks are an example of such a data structure. In such implementations, a single set of host instructions as well as a single set of memory operations may be used to insert and delete for all types of supported data structures. For example, generic "ains rs1, rs2, rd" and "adel rs, rd1, rd2" instructions may be utilized for stacks instead of the aeq and adq instructions described for queues. Also, generic insert and delete memory commands may be utilized instead of the enqueue and dequeue examples described for queues. The metadata associated with the data structure may specify the type of structure which, in turn, may determine the specific insertion and deletion semantics invoked on the memory module in response to the commands. Alternatively, each type of supported data structure may have its own set of insertion and deletion instructions as well as unique memory commands which may determine the insertion and deletion semantics.

Similar techniques can be used to support atomic insertion and deletion as well as other operations for a variety of other data structures as well. Examples of other data structures include hashes, sorted lists, sorted trees, balanced trees, etc. Each such data structure type may have its own dedicated set of instructions and memory operations or they may all be accessed using a unified super-set of the operations needed for the individual data structures (with the metadata specifying the data structure type which, in turn, will determine the semantics and the supported set of operations). The implementations of operations on these more complex data structures may adhere to the semantics of the data structure (e.g., insertion into a sorted list will retain the sorted order). Many of these more general data structures may also benefit from the user code having direct access to the payload data. Therefore, obtaining a plain pointer to the payload data may also be supported for some (or all) such data structures.

In some implementations, the PNM may not have virtual address translation capabilities. In such cases, the payload of each data structure may be contained within a region of memory that is contiguous in physical address space and may be pinned to avoid the memory containing the data structure being paged out. Further, the metadata block for each data structure may also be contained within a contiguous range of addresses and be pinned. In implementations where PNM has virtual address translation capabilities, the requirements on contiguous physical memory and pinning can be relaxed. However, efficiency may be improved by enforcing these constraints to reduce the number of address translations needed by the PNM. Further, page faults or other exceptions resulting from virtual address translation on PNM may be attributed to the initiating instruction on the host processor. As a result, the implementation may support the re-execution of the initiating instruction upon handling of any such exceptions.

Although embodiments may be implemented in the context of DRAM, it is applicable to PNM with other kinds of memories (e.g., phase-change memory, resistive memory) as well. Still further, in architectures that coalesce memory accesses (e.g., GPUs), these accesses may be performed in one of two manners. In a first manner, the accesses may be uncoalesced similar to atomics in current GPU implementations. In a second manner, adjacent memory words may be used for each lane in the machine. In this implementation, the PNM hardware may be setup to ignore the low order bits of the queue handle Or in the above examples) so that accesses from all lanes map to the same queue as intended although they use different addresses.

Figure 5:
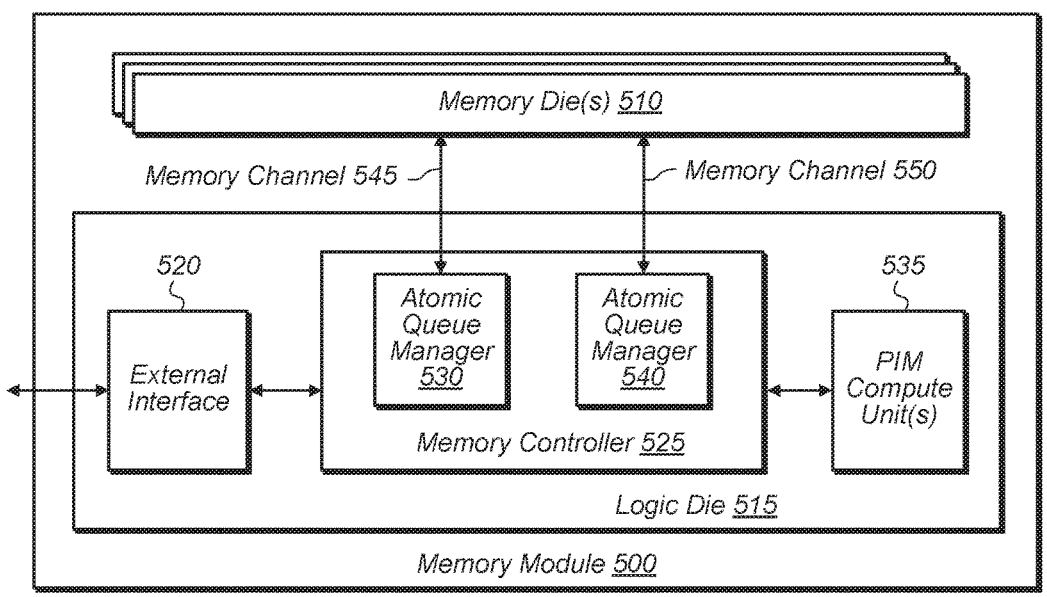
FIG. 5 is a block diagram of another embodiment of a memory module.

Referring now to FIG. 5, a block diagram of another embodiment of a memory module 500 is shown. Memory module 500 may include memory die(s) 510 and logic die 515. Logic die 515 may include external interface 520, memory controller 525, and processing in memory (PIM) compute unit(s) 535. Memory controller 525 may include an atomic queue manager for each memory channel to memory die(s) 510. As shown in FIG. 5, memory controller 525 may include atomic queue managers 530 and 540 to manage atomic queues allocated in memory die(s) 510. Atomic queue manager 530 may be configured to manage atomic queues allocated in memory accessible on memory channel 545, and atomic queue manager 540 may be configured to manage atomic queues allocated in memory accessible on memory channel 550. In other embodiments, memory module 500 may have other numbers of memory controllers, memory channels and atomic queue managers.

When system software running on a host processor (not shown) allocates an atomic queue in memory module 500, the system software may allocate the atomic queue such that it only spans a single memory channel of memory module 500. This ensures that a single atomic queue manager can be used to manage accesses to the atomic queue since the atomic queue manager is a single point at which all operations to the atomic queue must pass through. After allocating the atomic queue in memory die(s) 500, the system software may identify the atomic queue manager which corresponds to the memory channel on which the atomic queue was allocated, and then the system software may notify the atomic queue manager of the newly allocated atomic queue. The notification may include the handle to the queue metadata of the newly allocated atomic queue. In another embodiment, the system software may send a request to an atomic queue manager to allocate an atomic queue, and then the atomic queue manager may allocate the atomic queue in memory die(s) 510.

Figure 6:
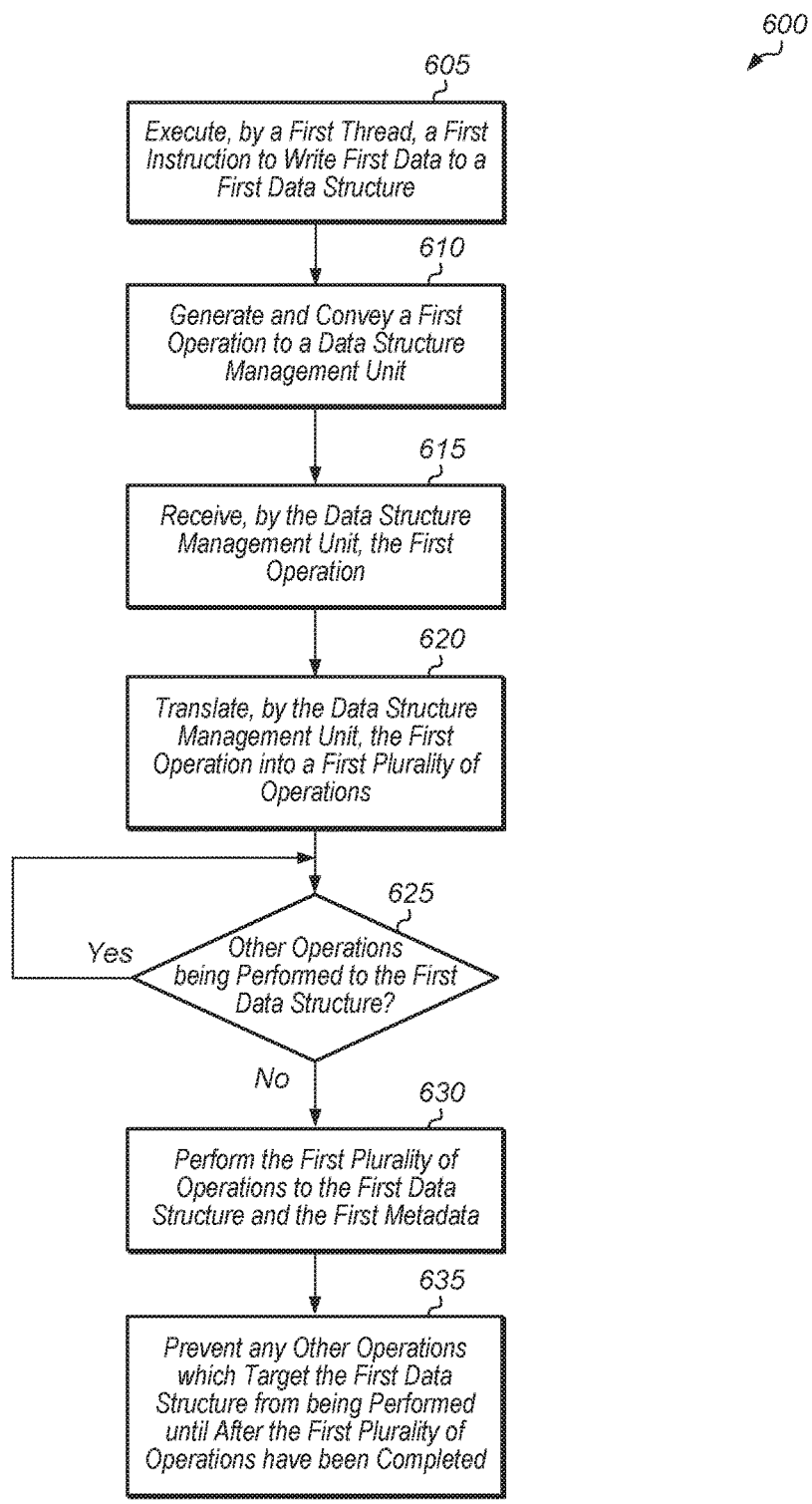
FIG. 6 is a generalized flow diagram illustrating one embodiment of a method for accessing a shared data structure.

Turning now to FIG. 6, one embodiment of a method 600 for accessing a shared data structure is shown. For purposes of discussion, the steps in this embodiment are shown in sequential order. However, it should be noted that in various embodiments, one or more of the steps described may be performed concurrently, in a different order than shown, or may be omitted entirely. Other additional steps may also be performed as desired. Similarly, other methods described herein may be presented with steps in a particular sequence. However, those methods may likewise vary as noted above. Any of the various systems or apparatuses described herein may be configured to implement method 600.

A first thread may execute a first instruction to write first data to a first data structure (block 605). The first data structure may be shared among a plurality of threads, processes, application, processors, processing units, or other software/hardware entities. In one embodiment, the first data structure may be a queue, while in other embodiments, the first data structure may be any of various other types of data structures. In response to executing the first instruction, the first thread may generate and convey a first operation to a data structure management unit (block 610). In one embodiment, the data structure management unit (e.g., atomic queue manager 330 of FIG. 3) may be located in the memory controller. In another embodiment, the data structure management unit may be located adjacent to the memory controller or in another location where all operations targeting the first data structure will pass through. It is noted that the data structure management unit may also be referred to as an atomic queue management unit, queue management unit, an atomic queue manager, or control logic.

Next, the data structure management unit may receive the first operation (block 615). Then, the data structure management unit may translate the first operation into a first plurality of operations (block 620). The first plurality of operations may include one or more operations accessing the first data structure and multiple operations for updating first metadata corresponding to the first data structure. In one embodiment, when the first data structure is a queue, the operations for updating the first metadata may include an operation to determine if the queue is full, an operation to adjust the tail pointer, and an operation to increment the count of elements in the queue. If the queue is full, then the other operations may be cancelled. In other embodiments, the operations for updating the first metadata may include other types and/or numbers of operations.

Next, the data structure management unit may determine if any other operations are currently being performed to the first data structure (conditional block 625). If any other operations are currently being performed to the first data structure (conditional block 625, "yes" leg), then method 600 may wait at conditional block 625. If no other operations are currently being performed to the first data structure (conditional block 625, "no" leg), then the data structure management unit may cause the first plurality of operations to be performed to the first data structure and the first metadata (block 630). The data structure management unit may also prevent any other operations which target the first data structure from being performed until after the first plurality of operations have been completed (block 635). After block 635, method 600 may end.

It is noted that prior to the first plurality of operations being completed, a second thread may execute a second instruction to write second data to or read data from the first data structure. In one embodiment, the first thread may execute on a first processor and the second thread may execute on a second processor, with the second processor being a different processor from the first processor. The second thread may generate and convey a second operation to the data structure management unit, and the data structure management unit may translate the second operation into a second plurality of operations. However, the data structure management unit may prevent the second plurality of operations from being performed to the first data structure until after the first plurality of operations have been completed.

Figure 7:
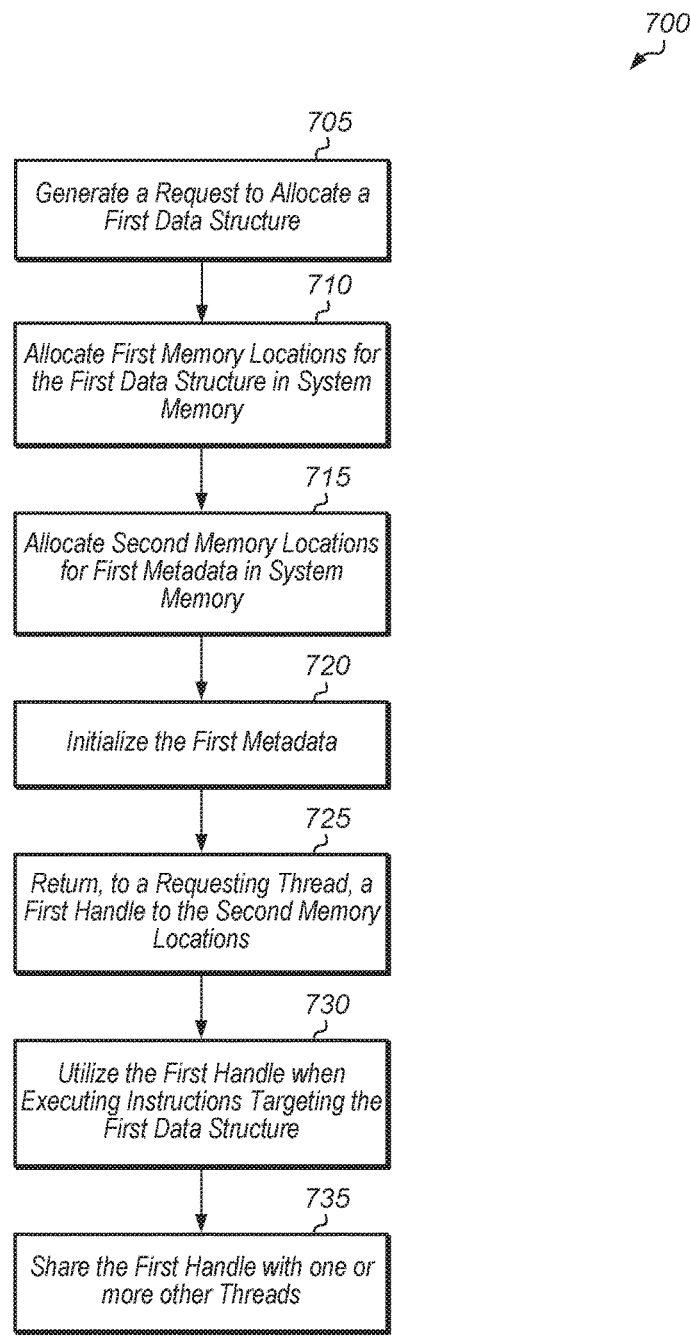
FIG. 7 is a generalized flow diagram illustrating one embodiment of a method for allocating a shared data structure.

Referring now to FIG. 7, one embodiment of a method 700 for allocating a shared data structure is shown. For purposes of discussion, the steps in this embodiment are shown in sequential order. However, it should be noted that in various embodiments, one or more of the steps described may be performed concurrently, in a different order than shown, or may be omitted entirely. Other additional steps may also be performed as desired. Similarly, other methods described herein may be presented with steps in a particular sequence. However, those methods may likewise vary as noted above. Any of the various systems or apparatuses described herein may be configured to implement method 700.

A first thread may generate a request to allocate a first data structure (block 705). In response to the thread generating the request to allocate the first data structure, system software may allocate first memory locations for the first data structure in system memory (block 710). The first memory locations may include any number of memory blocks or bytes, depending on the embodiment. In some embodiments, the request may specify a size of the first data structure in a number of memory blocks, bytes, or other units. System software may also allocate second memory locations for first metadata in system memory (block 715). The first metadata may include data defining attributes of the first data structure.

Next, the data structure management unit may initialize the first metadata (block 720). In one embodiment, the first metadata may include a head pointer, tail pointer, a count of a number of items in the first data structure, a payload start pointer, and a payload end pointer. In other embodiments, the first metadata may include other types of data and/or other numbers of attribute fields. Then, the data structure management unit may return, to the first thread, a first handle to the second memory locations (block 725). The first thread may utilize the first handle when executing instructions targeting the first data structure (block 730). The first thread may also share the first handle with one or more other threads (block 735). After block 735, method 700 may end.

Figure 8:
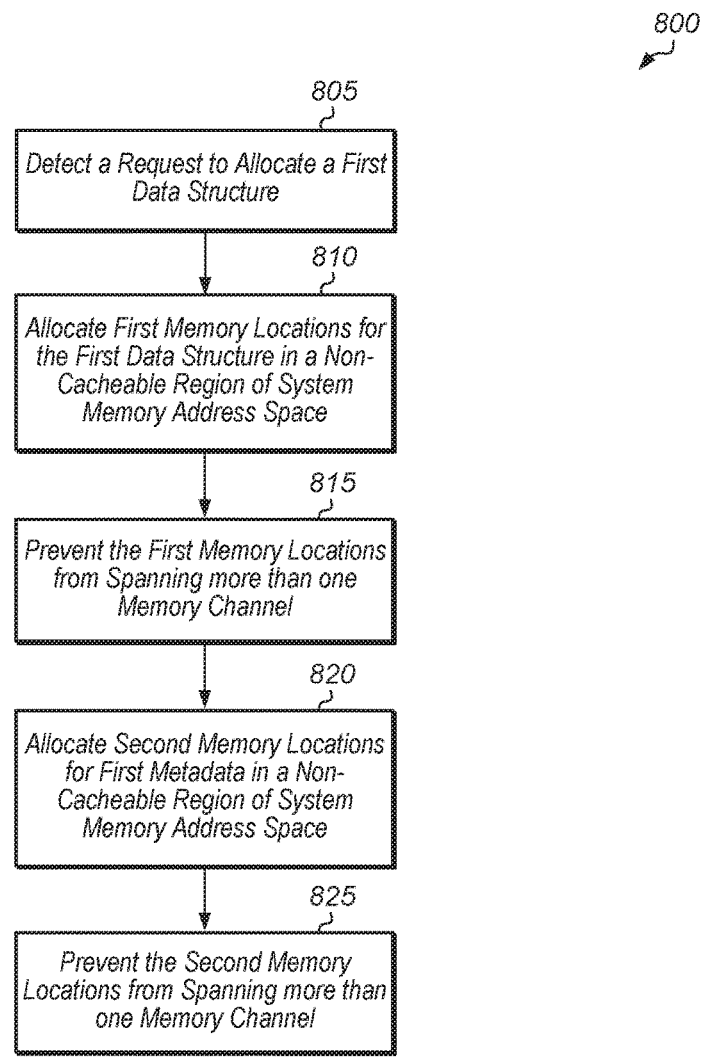
FIG. 8 is a generalized flow diagram illustrating another embodiment of a method for allocating a shared data structure.

Referring now to FIG. 8, another embodiment of a method 800 for allocating a shared data structure is shown. For purposes of discussion, the steps in this embodiment are shown in sequential order. However, it should be noted that in various embodiments, one or more of the steps described may be performed concurrently, in a different order than shown, or may be omitted entirely. Other additional steps may also be performed as desired. Similarly, other methods described herein may be presented with steps in a particular sequence. However, those methods may likewise vary as noted above. Any of the various systems or apparatuses described herein may be configured to implement method 800.

System software may detect a request to allocate a first data structure (block 805). In response to detecting the request to allocate the first data structure, system software may allocate first memory locations for the first data structure in a non-cacheable region of system memory address space (block 810). In one embodiment, the first data structure may be a queue, and the first memory locations may be used to store the data entries of the queue.

System software may also prevent the first memory locations from spanning more than one memory channel (block 815). In other words, system software may allocate the first memory locations so that the first memory locations span only a single memory channel. Also, system software may also allocate second memory locations for first metadata, corresponding to the first data structure, in a non-cacheable region of system memory address space (block 820). Still further, system software may prevent the second memory locations from spanning more than one memory channel (block 825). After block 825, method 800 may end. It is noted that the system software and/or the data structure management unit may perform any of the above steps of method 800.

Figure 9:
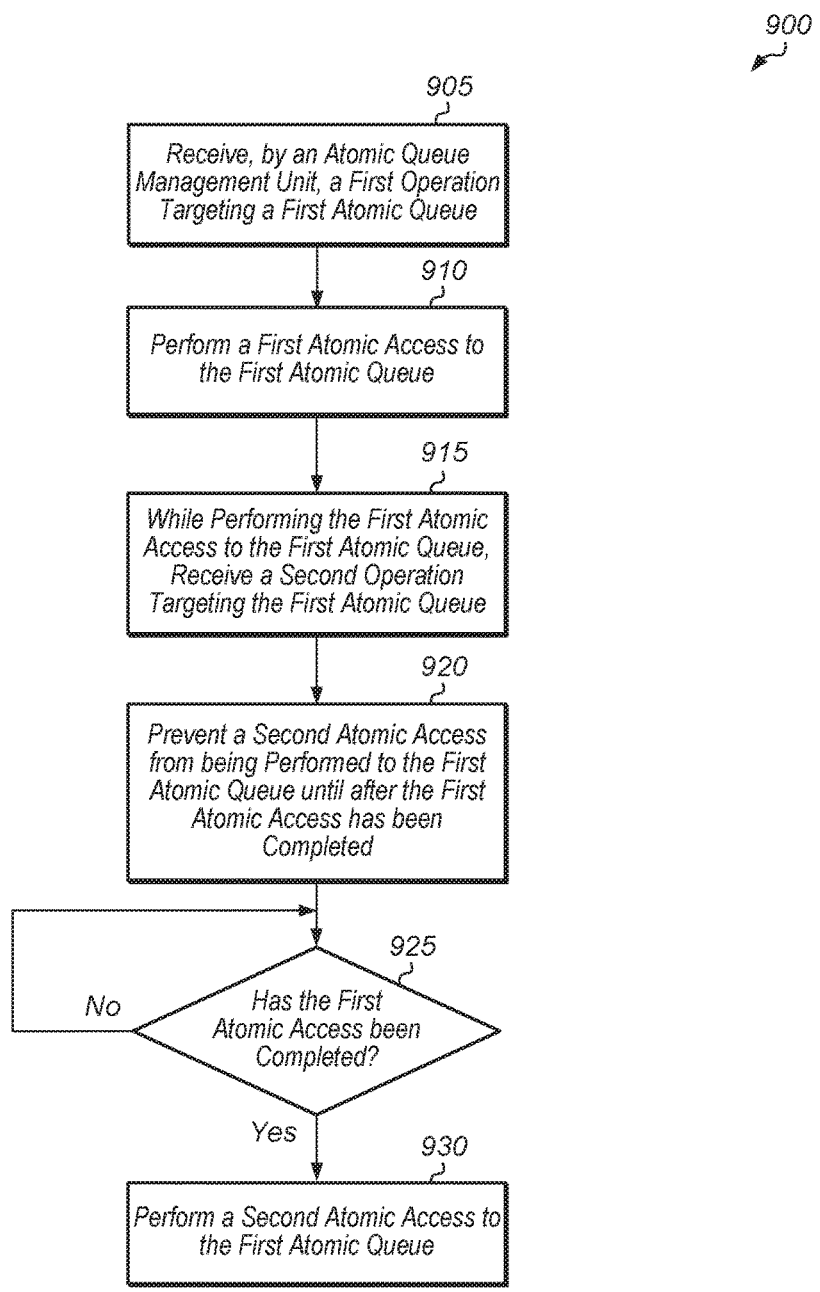
FIG. 9 is a generalized flow diagram illustrating one embodiment of a method for accessing an atomic queue.

Referring now to FIG. 9, one embodiment of a method 900 for accessing an atomic queue is shown. For purposes of discussion, the steps in this embodiment are shown in sequential order. However, it should be noted that in various embodiments, one or more of the steps described may be performed concurrently, in a different order than shown, or may be omitted entirely. Other additional steps may also be performed as desired. Similarly, other methods described herein may be presented with steps in a particular sequence. However, those methods may likewise vary as noted above. Any of the various systems or apparatuses described herein may be configured to implement method 900. It is also noted that both FIGS. 9 and 10 describe a "queue" for ease of discussion. However, the methods are applicable to other types of data structures such as stacks, tree structures, tables, and otherwise.

An atomic queue management unit may receive a first operation targeting a first atomic queue (block 905). The first operation may be an enqueue operation or a dequeue operation. In one embodiment, the atomic queue management unit may be located within a memory controller. In response to receiving the first operation, the atomic queue management unit may perform a first atomic access to the first atomic queue (block 910). The first atomic access may include an access to the first atomic queue and one or more queue metadata update operations.

While performing the first atomic access to the first atomic queue, the atomic queue management unit may receive a second operation targeting the first atomic queue (block 915). In response to receiving the second operation targeting the first atomic queue, the atomic queue management unit may prevent a second atomic access (corresponding to the second operation) from being performed to the first atomic queue until after the first atomic access is completed (block 920). Next, the atomic queue management unit may determine if the first atomic access has been completed (conditional block 925). If the first atomic access has been completed (conditional block 925, "yes" leg), then the atomic queue management unit may perform the second atomic access (block 930). After block 930, method 900 may end. If the first atomic access has not been completed (conditional block 925, "no" leg), then method 900 may remain at conditional block 925.

Figure 10:
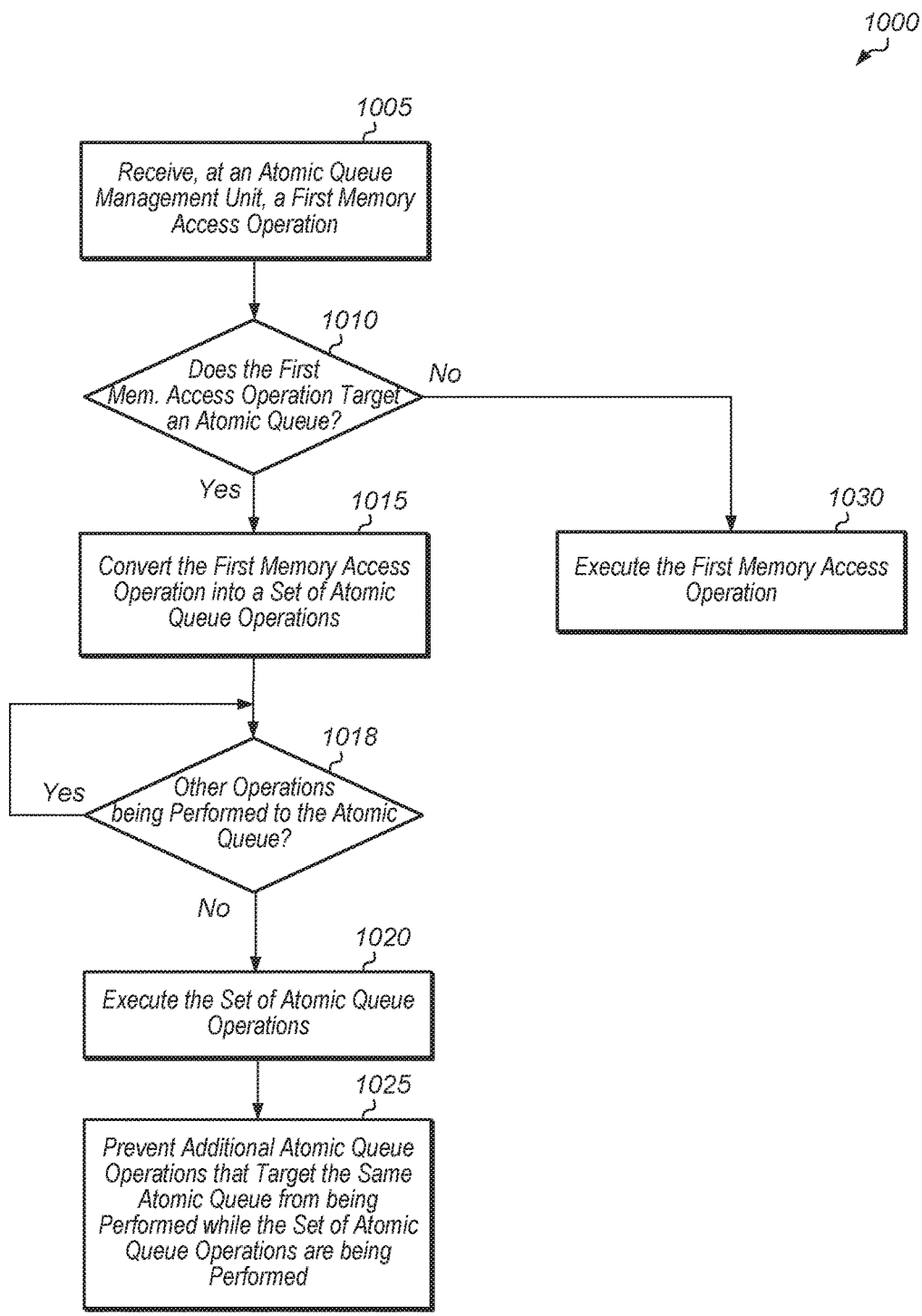
FIG. 10 is a generalized flow diagram illustrating one embodiment of a method for processing a memory access operation to an atomic queue.

Turning now to FIG. 10, one embodiment of a method 1000 for processing a memory access operation is shown. For purposes of discussion, the steps in this embodiment are shown in sequential order. However, it should be noted that in various embodiments, one or more of the steps described may be performed concurrently, in a different order than shown, or may be omitted entirely. Other additional steps may also be performed as desired. Similarly, other methods described herein may be presented with steps in a particular sequence. However, those methods may likewise vary as noted above. Any of the various systems or apparatuses described herein may be configured to implement method 1000.

An atomic queue management unit may receive a first memory access operation (block 1005). The first memory access operation may be a store operation or a load operation. In one embodiment, the atomic queue management unit may be located within a memory controller. The first memory access operation may have been generated by a given thread executing on a local or remote processor. In response to receiving the first memory access operation, the atomic queue management unit may determine if the first memory access operation targets an atomic queue (conditional block 1010). In one embodiment, metadata of the atomic queues may be allocated to a given region of address space, and the atomic queue management unit may determine if the first memory access operation targets the given region of address space. In another embodiment, the atomic queue management unit may maintain a table of active or valid atomic queues, and the atomic queue management unit may perform a lookup of the table to determine if the first memory access operation targets an active atomic queue. Other techniques for determining if the first memory access operation targets an atomic queue are possible and contemplated.

If the first memory access operation targets an atomic queue (conditional block 1010, "yes" leg), then the atomic queue management unit may convert the first memory access operation into a set of atomic queue operations (block 1015). The set of atomic queue operations may include a queue access operation and a plurality of queue metadata update operations. For example, if the first memory access operation is a store operation, the atomic queue management unit may convert the store operation into an atomic enqueue operation and queue metadata update operations. Alternatively, if the first memory access operation is a load operation, the atomic queue management unit may convert the load operation into an atomic dequeue operation and queue metadata update operations. Next, the management unit may determine if any other operations are currently being performed to the queue (conditional block 1018). If any other operations are currently being performed to the queue (conditional block 1018, "yes" leg), then method 1000 may wait at conditional block 1018. If no other operations are currently being performed to the queue, then the atomic queue management unit and/or memory controller may execute the set of atomic queue operations (block 1020). While the set of atomic queue operations are being performed, the atomic queue management unit may prevent additional atomic queue operations that target the same atomic queue from being performed (block 1025). If the first memory access operation does not target an atomic queue (conditional block 1010, "no" leg), then the memory controller may execute the first memory access operation (block 1030). After blocks 1025 and 1030, method 1000 may end.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computing system during use to provide the program instructions and accompanying data to the computing system for program execution. The computing system may include at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
   one or more memory devices;
   one or more processors; and
   one or more memory controllers comprising:
   a first interface configured to be coupled to the one or more processors;
   a second interface configured to be coupled to the one or more memory devices; and
   control logic;
   wherein responsive to receiving a first memory access operation from a first processor via the first interface, the control logic is configured to:
   in response to determining the first memory access operation does not target an atomic data structure, execute the first memory access operation;
   in response to determining the first memory access operation targets an atomic data structure:
   convert the first memory access operation into at least a first access and a second access;
   perform the first access to metadata via the second interface, wherein the metadata corresponds to a data structure referenced by the first memory access operation; and
   perform the second access to the data structure via the second interface, wherein the second access is specified by the first memory access operation.

2. The system as recited in claim 1, wherein determining the first memory access operation targets the atomic data structure comprises performing a lookup of a table of active or valid atomic data structures.

3. The system as recited in claim 1, wherein the metadata comprises at least one of: a head pointer, tail pointer, a count of a number of items in the data structure, a payload start pointer, and a payload end pointer.

4. The system as recited in claim 1, the one or more processors are configured to:
   allocate first memory locations for the data structure in the one or more memory devices responsive to detecting a request to allocate the data structure;
   allocate second memory locations for metadata in the one or more memory devices;
   initialize the metadata; and
   return, to a requesting thread, a handle to the second memory locations.

5. The system as recited in claim 4, wherein the one or more processors are configured to allocate the first memory locations and second memory locations in a non-cacheable region of system memory address space.

6. The system as recited in claim 1, wherein each of the one or more memory controllers are included within the one or more memory devices.

7. The system as recited in claim 4, wherein the data structure is a queue, and wherein the first memory access operation identifies a first handle to the metadata of the data structure.

8. A memory controller comprising:
   a first interface configured to be coupled to one or more processors;
   a second interface configured to be coupled to one or more memory devices; and
   control logic;
   wherein responsive to receiving a first memory access operation from a first processor via the first interface, the control logic is configured to:
   in response to determining the first memory access operation does not target an atomic data structure, execute the first memory access operation;
   in response to determining the first memory access operation targets an atomic data structure:
   convert the first memory access operation into at least a first access and a second access;
   perform the first access to metadata via the second interface, wherein the metadata corresponds to a data structure referenced by the first memory access operation; and
   perform the second access to the data structure via the second interface, wherein the second access is specified by the first memory access operation.

9. The memory controller as recited in claim 8, wherein determining the first memory access operation targets the atomic data structure comprises performing a lookup of a table of active or valid atomic data structures.

10. The memory controller as recited in claim 8, wherein the metadata comprises at least one of a head pointer, tail pointer, a count of a number of items in the data structure, a payload start pointer, and a payload end pointer.

11. The memory controller as recited in claim 8, wherein the control logic is configured to determine a location of the data structure from the metadata.

12. The memory controller as recited in claim 8, wherein prior to completing the first and second access, the memory controller is configured to:
    receive a second operation from a second processor;
    determine that the second operation references the data structure; and
    prevent accesses, corresponding to the second operation, from being performed to the data structure until after the first and second access have been completed.

13. The memory controller as recited in claim 8, wherein the memory controller comprises a plurality of memory channels, wherein the data structure and the metadata are allocated to span only a single memory channel, and wherein the data structure and the metadata are allocated in a non-cacheable region of system memory address space.

14. The memory controller as recited in claim 8, wherein the data structure is a queue, and wherein the first operation identifies a first handle to metadata of the data structure.

15. A method comprising:
    in response to receiving a first memory access operation from a first processor via a first interface:
    in response to determining the first memory access operation does not target an atomic data structure, executing the first memory access operation;
    in response to determining the first memory access operation targets an atomic data structure:
    converting the first memory access operation into at least a first access and a second access;
    performing the first access to metadata via a second interface responsive to receiving a first memory access operation from a first processor via the first interface, wherein the metadata corresponds to a data structure referenced by the first operation; and
    performing the second access to the data structure via the second interface, wherein the second access is specified by the first memory access operation.

16. The method as recited in claim 15, wherein determining the first memory access operation targets the atomic data structure comprises performing a lookup of a table of active or valid atomic data structures.

17. The method as recited in claim 15, wherein the metadata comprises at least one of a head pointer, tail pointer, a count of a number of items in the data structure, a payload start pointer, and a payload end pointer.

18. The method as recited in claim 15, wherein the method further comprising:
- allocating first memory locations for the data structure in system memory responsive to detecting a request to allocate the data structure;
- allocating second memory locations for the metadata in the one or more memory devices;
- initializing the metadata; and
- returning, to a requesting thread, a handle to the second memory locations.

19. The method as recited in claim 18, further comprising allocating the first memory locations and second memory locations in a non-cacheable region of system memory address space.

20. The method as recited in claim 18, further comprising allocating the first memory locations and second memory locations to span only a single memory channel.

* * * * *